United States Patent [19]
Akai et al.

[11] Patent Number: 5,638,507
[45] Date of Patent: Jun. 10, 1997

[54] DUPLEX COMPUTER SYSTEM

[76] Inventors: Hajime Akai, 1-31-6, Kichijoji Minami-cho, Musashino-shi, Tokyo; Hitoshi Yasui, 2-16-21, Yanagikubo, Higashi Kurume-shi, Tokyo; Masayuki Nakagawa, 2-9-15, Goten-yama; Shunsuke Hayashi, 3-3-5, Nishikubo, both of Musashino-shi, Tokyo; Sadatoshi Sogo, 3-4-10, Tamako-cho, Higashi Murayama-shi, Tokyo, all of Japan

[21] Appl. No.: 502,202

[22] Filed: Mar. 30, 1990

[30] Foreign Application Priority Data

| Apr. 4, 1989 | [JP] | Japan | 1-85615 |
| Apr. 20, 1989 | [JP] | Japan | 1-101362 |
| Aug. 22, 1989 | [JP] | Japan | 1-215378 |
| Nov. 18, 1989 | [JP] | Japan | 1-300616 |
| Dec. 7, 1989 | [JP] | Japan | 1-318228 |
| Dec. 13, 1989 | [JP] | Japan | 1-323086 |

[51] Int. Cl.$^6$ ............................................. G06F 15/177
[52] U.S. Cl. ........................................ 395/182.11; 395/800
[58] Field of Search ................................ 395/550, 200, 395/800, 182.11

[56] References Cited

U.S. PATENT DOCUMENTS

| 4,276,593 | 6/1981 | Hansen | 364/119 |
| 4,491,946 | 1/1985 | Kryskow, Jr. et al. | 370/89 |
| 4,500,951 | 2/1985 | Sugimoto et al. | 364/186 |
| 4,521,871 | 6/1985 | Galdun et al. | 364/900 |
| 4,607,256 | 8/1986 | Henzel | 340/825.52 |
| 4,623,883 | 11/1986 | Konen | 340/825.01 |
| 4,872,106 | 10/1989 | Slater | 395/575 |
| 4,984,240 | 1/1991 | Keren-Zvi et al. | 371/8.2 |
| 5,058,056 | 10/1991 | Hammer et al. | 364/900 |

*Primary Examiner*—William M. Treat
*Attorney, Agent, or Firm*—Pennie & Edmonds LLP

[57] ABSTRACT

Herein disclosed is a duplex computer system to be used in process automations or factory automations. The system is constructed of two computer (or processor) systems connected with a common backplane bus and a plurality of I/O units to be controlled by those computer systems. Each of these systems is composed of a CPU having a self-diagnosis function for outputting a ready signal indicating whether or not its operations can be normally accomplished, a communication interface unit for interfacing with the backplane bus, and a duplex control unit that receives the ready signal output from the CPU in order to determine which of the computer systems is to be brought into a control status while the other is brought into a standby status. Thus, it is possible to provide a highly reliable system, in which the duplex control can be accomplished without providing an independent duplex control unit between the two computer systems, and in which trouble experienced by one computer system will not exert any influence upon the operations of the other computer system.

3 Claims, 13 Drawing Sheets

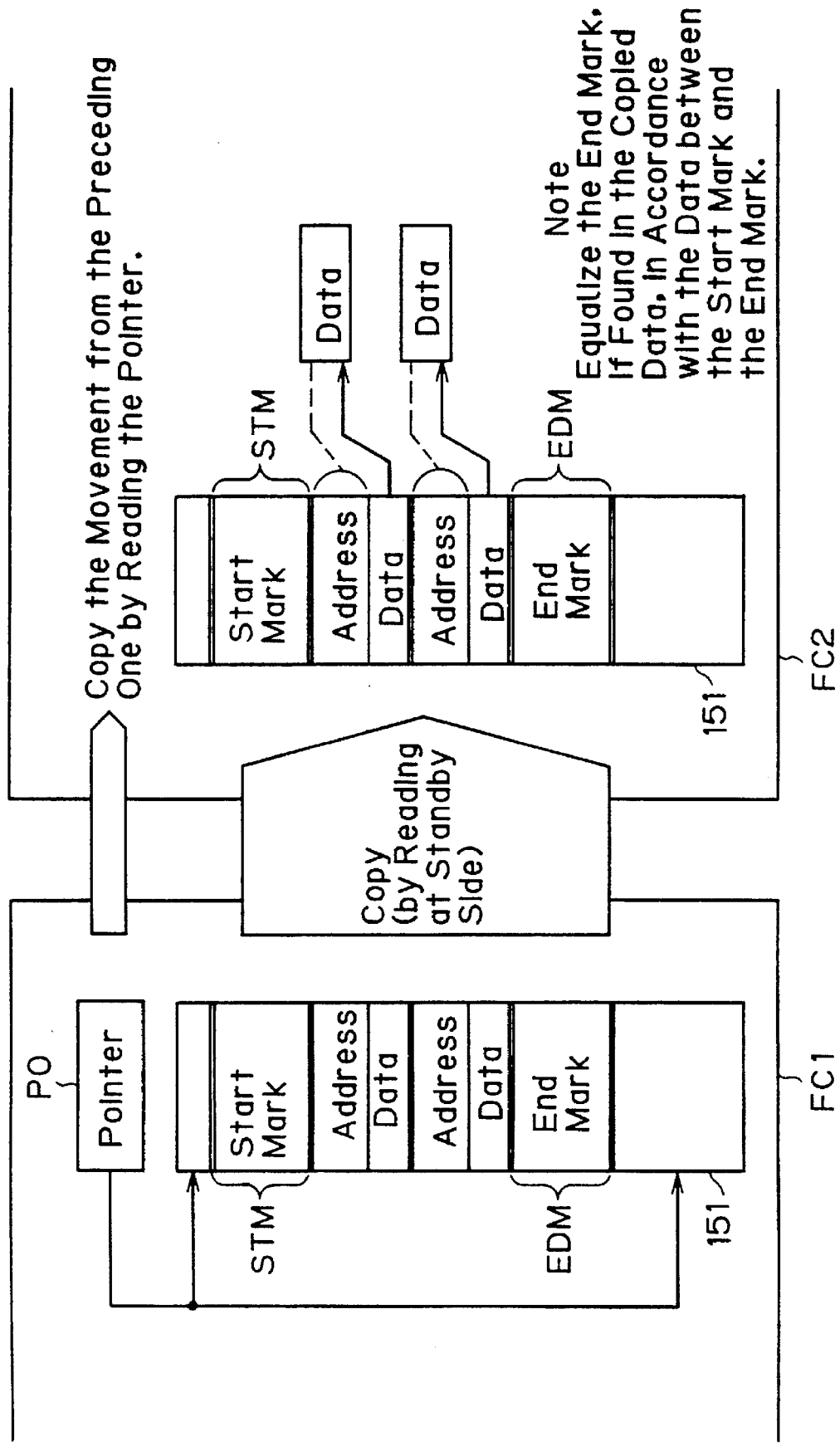

DUPLEX COMPUTER SYSTEM

BACKGROUND OF THE INVENTION

1. Field of the Invention

The present invention relates to a duplex computer system to be used to control process automations or factory automations. Specifically, the invention relates to duplexed computer systems connected with a common communication line (or backplane bus) and a plurality of I/O units to be connected to and controlled by the computer systems. More specifically, the present invention relates to a duplex computer system of the redundancy standby type, in which one computer is engaged in real work (in a control or running status) whereas the other computer is held in a standby status, prepared to take over control of the process or factory automation if the former computer system experiences trouble. Even more specifically, the invention relates to such a duplex computer system which avoids the use of an independent means connected between the two computers for performing the duplex control, i.e., holding one of the two computers in the control status and the other in the standby status.

2. Description of the Prior Art

In the prior art, duplex computer systems of the standby redundancy type have been adopted as one method for enhancing the reliability of automation control systems. Examples of such duplex computer systems are disclosed in U.S. Pat. Nos. 3,503,048, 3,562,761 and 3,864,670.

FIG. 1 is a block diagram showing the structure of one example of a duplex computer system of the prior art, which is disclosed in U.S. Pat. No. 3,864,670. This system is composed of two computer processor units FC1 and FC2 (field controller 1 and 2), a duplex control unit DXC for monitoring the operations of those computers, and a plurality of input/output units IO1 to IOn connected with the two computers via a bus.

The duplex control unit DXC receives ready signals RDY0 and RDY1, which are obtained mainly from self-diagnosis results (such as memory access checks to detect parity errors or a no-response, arithmetic checks, or I/O response checks), that indicate the operation status of the two computers used to perform the duplex control operations. In this arrangement, a first computer is maintained in a control status while the second is held in a standby status whereby the second computer is switched to control status if the first computer experiences trouble or is removed from the system for maintenance.

In the prior art system of FIG. 1, the computer in control status either executes communications with a main computer terminal (not shown) or outputs control arithmetic results to the various input/output units IOi. The computer in standby status performs none of the control arithmetic operations nor the communications but does the self-diagnosis or database equalizations so that it may standby for smoothly switching to control status.

A disadvantage of this prior art system is that it must be equipped with the independent duplex control unit DXC between the two computers, thus complicating its structure. Still worse, if one of the two computers is used to carry out the control operations, or if one computer is extracted from the system, a setting switch for indicating that condition must be operated.

Another system, which has no independent duplex control unit between the two computers, is disclosed in WO86/00439 (i.e., International Application No. PCT/US85/00936). However, this system is not constructed to prevent trouble experienced by one computer from exerting influence upon the other computer. In addition, it cannot be modified simply to a single computer system, which controls a process or factory automation with only one computer.

SUMMARY OF THE INVENTION

The present invention has been conceived in view of the problems described above and has as one object to provide a duplex computer system that is able to perform the duplex control without requiring any duplex control unit independent of the two computers, in which any trouble experienced by one computer will not exert any influence upon the other computer, and which can be modified simply to a single computer system for controlling a process or factory automation with only one computer.

Another object of the present invention is to provide a duplex computer system which is able to switch control status from one computer to the other even for trouble experienced either by its own communications interface unit or by a backplane bus, without exerting any influence upon the communications of the total computer system. Still another object of the invention is to improve the reliability of such duplex computer systems.

Yet another object of the present invention is to provide a system which is able to load easily a program from a main computer terminal.

BRIEF DESCRIPTION OF THE DRAWINGS

FIG. 14 is a diagram showing the concept of the data equalizing operations of the system of FIG. 13.

DESCRIPTION OF THE PREFERRED EMBODIMENTS

First Preferred Embodiment

Figure 1:
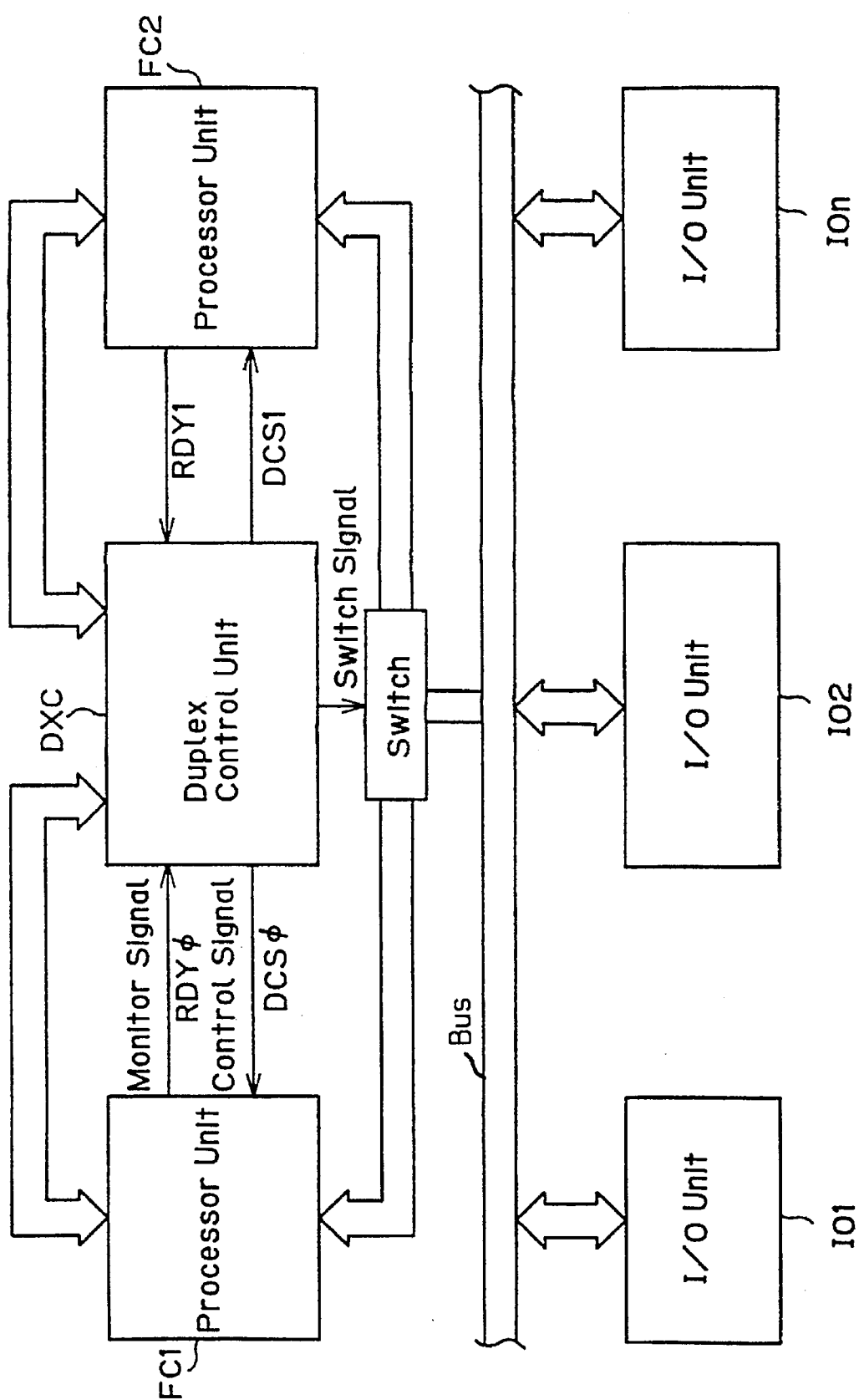
FIG. 1 is a block diagram showing the structure of an example of a duplex computer system of the prior art.
Figure 2:
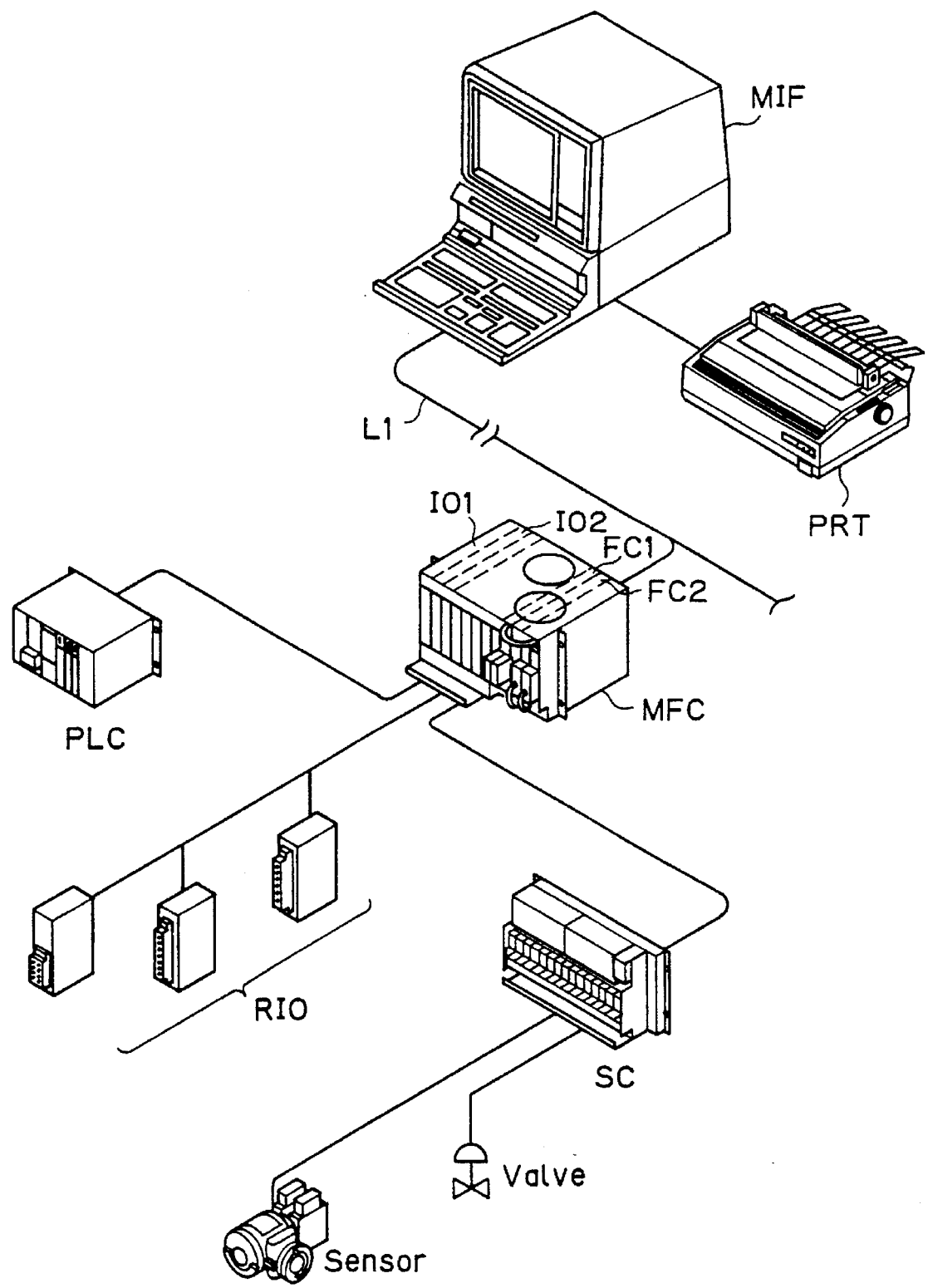
FIG. 2 is a conceptual diagram showing the structure of a total system of which a duplex computer system according to the present invention is a part.

FIG. 2 is a structural diagram showing the concept of a total system for controlling a process or factory automation (hereinafter "the process") to which the present invention is applied. Reference letters MIF (man-machine interface) designate a main computer terminal functioning as an operator station and having a CRT display and a keyboard. Letters PRT designate a printer connected with the main computer terminal MIF.

MFC (main field controller) designates a control unit connected with main computer terminal MIF via a communication line L1. Control unit MFC, which incorporates the duplex computer system according to the present invention, has a feedback capability and a sequence capability to control the process and a capability to execute arithmetic equations. Communication line L1 is constructed to circulate a communication right (or baton frame) among a number of individual control units MFC so that the control unit MFC which acquires the communication right can communicate by using communications line L1.

SC designates a signal conditioner connected with control unit MFC, which is capable of interfacing a variety of sensors disposed in the field to a control board in control unit MFC. The control board functions to provide feedback control, sequential control, and arithmetic operations such as PID (proportional-integral-derivative) operations. Control unit MFC is further connected directly to a remote input/output unit RIO and a variety of sequencers PLC (program logic control).

Figure 3:
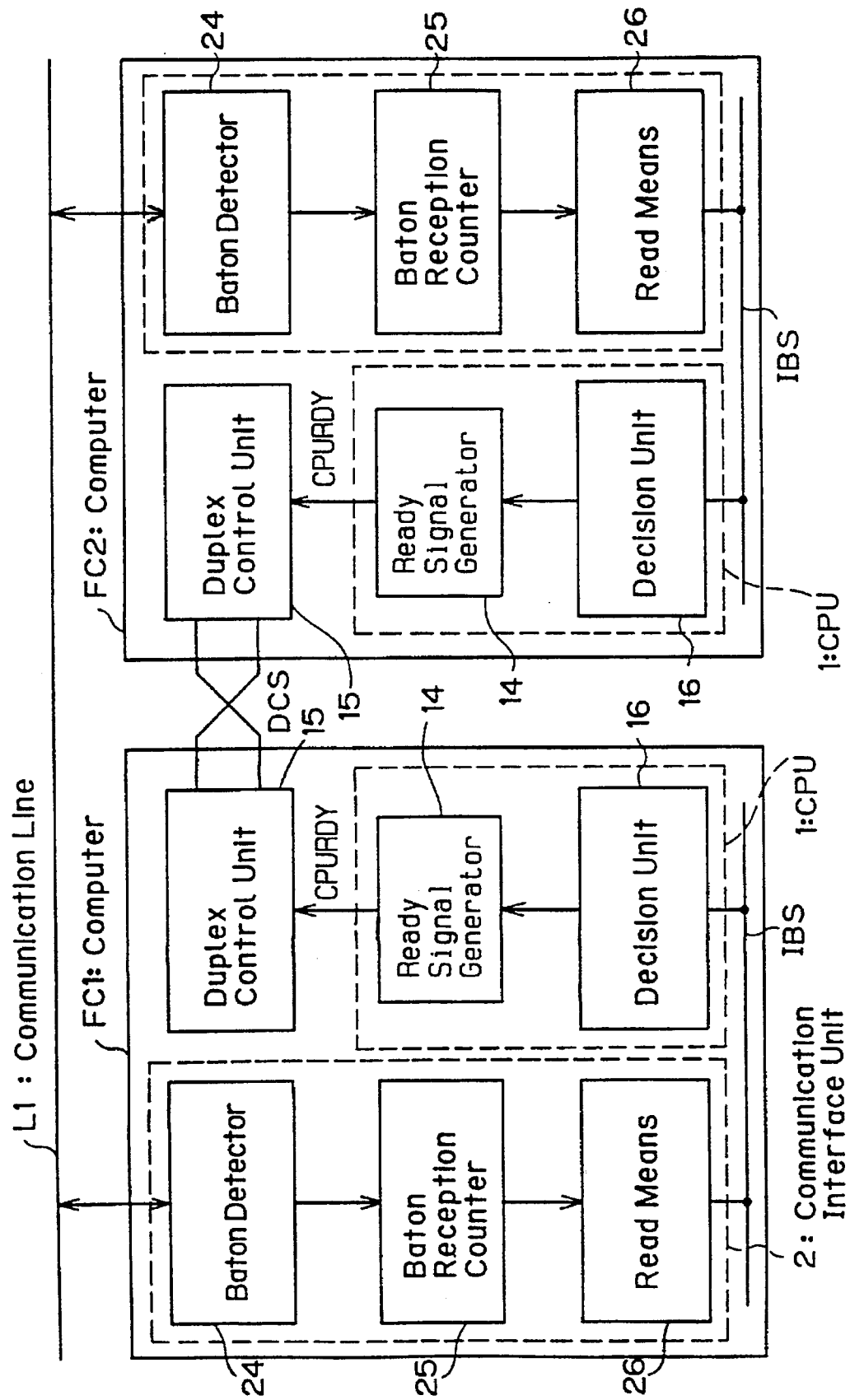
FIG. 3 is a block diagram showing the structure of a first embodiment of a duplex computer system of the present invention, which is disposed in control unit MFC of FIG. 2.

FIG. 3 is a block diagram showing the structure of one embodiment of the duplex computer system to be disposed in control unit MFC of FIG. 2.

Reference characters FC1 and FC2 designate duplexed first and second computer (or processor) systems which are connected with communication line L1 to main computer terminal MIF and which have substantially identical internal structures.

In each of the first and second computer systems FC1 and FC2, reference numeral 1 designates a central processing unit (CPU), and numeral 2 designates a communications interface unit for communication line L1. Communications interface unit 2 is connected to CPU 1 via an internal bus IBS.

Communications line L1 uses the baton pass (or token pass) method, in which the communication right for accessing it is sequentially carried about by the individual running computer systems connected to the communication line and by other systems, such that any one system may execute a communication when it receives the communication right (or baton frame).

In CPU 1, reference numeral 14 designates a ready signal generator for outputting a ready signal CPURDY on the basis of the result of a self-diagnosis. Numeral 16 designates a decision unit which responds to a signal from read means 26, described below. Decision unit 16 controls the operation of ready signal generator 14 on the basis of the value of the signal it receives. Numeral 15 designates a duplex control unit which is made responsive to ready signal CPURDY for controlling whether CPU 1 is brought into a running status (control status) or a standby status. For either of computer systems FC1 and FC2, if its CPU 1 is in control status, that computer system is described as the control or controlling side, while the computer system in standby status is the standby or controlled side. Generally, computer systems FC1 and FC2 are described as partner sides.

In communication interface unit 2, reference numeral 24 designates a baton detector for monitoring the signal on communication line L1 to detect when the baton frame indicating the communication right for communication line L1 circulates to computer system FC1. Baton detector 24 increments by one a value contained in a baton reception counter 25 when a baton frame is detected by baton detector 24. Numeral 26 designates read means for reading the content of the baton reception counter 25 and transmitting the data via internal bus IBS to decision unit 16.

Figure 4:
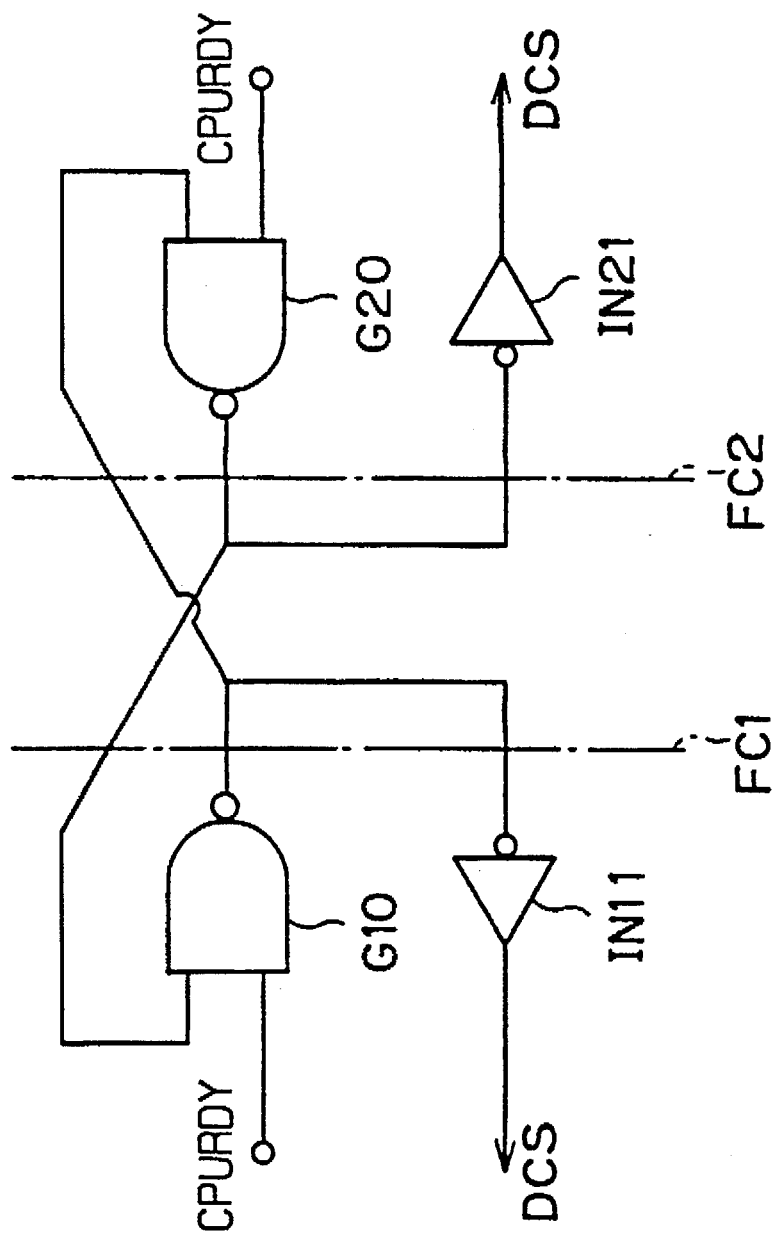
FIG. 4 is a diagram showing the connections of individual duplex control units 15 in first and second computer systems FC1 and FC2 of FIG. 3.

FIG. 4 is a diagram showing the connections of individual duplex control units 15 in each of the first and second computer systems FC1 and FC2 of FIG. 3.

Computer systems FC1 and FC2 are equipped with NAND gates G10 and G20, respectively, for inputting ready signals CPURDY from each ready signal generator 14. The two NAND gates are made to construct a flip-flop circuit by connecting each gate output to the input terminal of the NAND gate of the other computer system.

As a result, one of computer systems FC1 and FC2 computer system will be able to activate ready signal CPURDY earlier. That computer system then activates a control allowance signal (or duplex control signal) DCS, enabling it to acquire the control right so that it assumes running status, whereas the other computer system assumes standby status. Thus, the duplex switching operations are accomplished.

The following describes the operations of this embodiment of a duplex computer system constructed according to the present invention. It will be assumed that first computer system FC1 is in running status and second computer system FC2 is in standby status.

If a demand for communication occurs in first computer system FC1, it can perform the communicating operation when the baton frame comes around, i.e., when baton detector 24 receives the baton frame. When the communicating operation (i.e., the transmission) is ended, the baton frame is transmitted to a next computer system. If first computer system FC1 receives a baton frame addressed to itself when no data communication is demanded, the baton frame is instantly transmitted to the next computer system.

First computer system FC1, having transmitted the baton frame, monitors the signal on communication line L1 to detect an error indicating that communication interface unit 2 of the next computer system is experiencing trouble, making it impossible for this next computer system to receive the transmitted baton frame, or for first computer system FC1 either to transmit the baton frame according to the communication demand or to transmit the baton frame to the next computer system.

In case such an error is detected, first computer system FC1 corrects the destination of the baton frame in accordance with predetermined rules and transmits the baton frame to a computer system that is capable of receiving it at a corrected destination.

Thus, if one of the individual computer systems or other systems connected with communication line L1 is experiencing trouble, it is taken out of the circulating route of the baton frame so that the baton frame is circulated only among the computer or other systems that are operating normally.

In a computer system operating normally, baton detector 24 detects the baton frame at the time of each circulation and updates the content of the baton reception counter 25. Read means 26 reads out the content of baton reception counter 25 to transmit it to decision unit 16 via internal bus IBS.

A predetermined time interval is required for the baton frame to be circulated for one round among the system components connected to communication line L1. Decision unit 16 decides that communication interface unit 2 is operating normally if the content of baton reception counter 25 is updated at each predetermined time interval. If, on the contrary, the content of baton reception counter 25 is not updated for a time period longer than the predetermined interval, decision unit 16 decides that the baton frame cannot be received or transmitted because of trouble experienced by communications interface unit 2.

If decision unit 16 decides that communication interface unit 2 is experiencing trouble, it instructs ready signal generator 14 to deactivate ready signal CPURDY transmitted to duplex control unit 15.

If ready signal CPURDY is deactivated by duplex control unit 15, NAND circuit G10 has its output inverted, which inverts the flip-flop circuit composed of NAND circuits G10 and G20. As a result, control allowance signal DCS transmitted to second computer system FC2 is activated to switch second computer system FC2 to running status, thus restoring the communications ability of the total process control system.

In addition, when second computer system FC2 is in standby status, its decision unit 16 also performs the operations described above. The diagnosis of communication interface unit 2 at the standby side involves transmitting the baton frame via communication line L1 and receiving it again if communication interface unit 2 of the computer system in running status (FC1) is operating normally.

Second Preferred Embodiment

Figure 5:
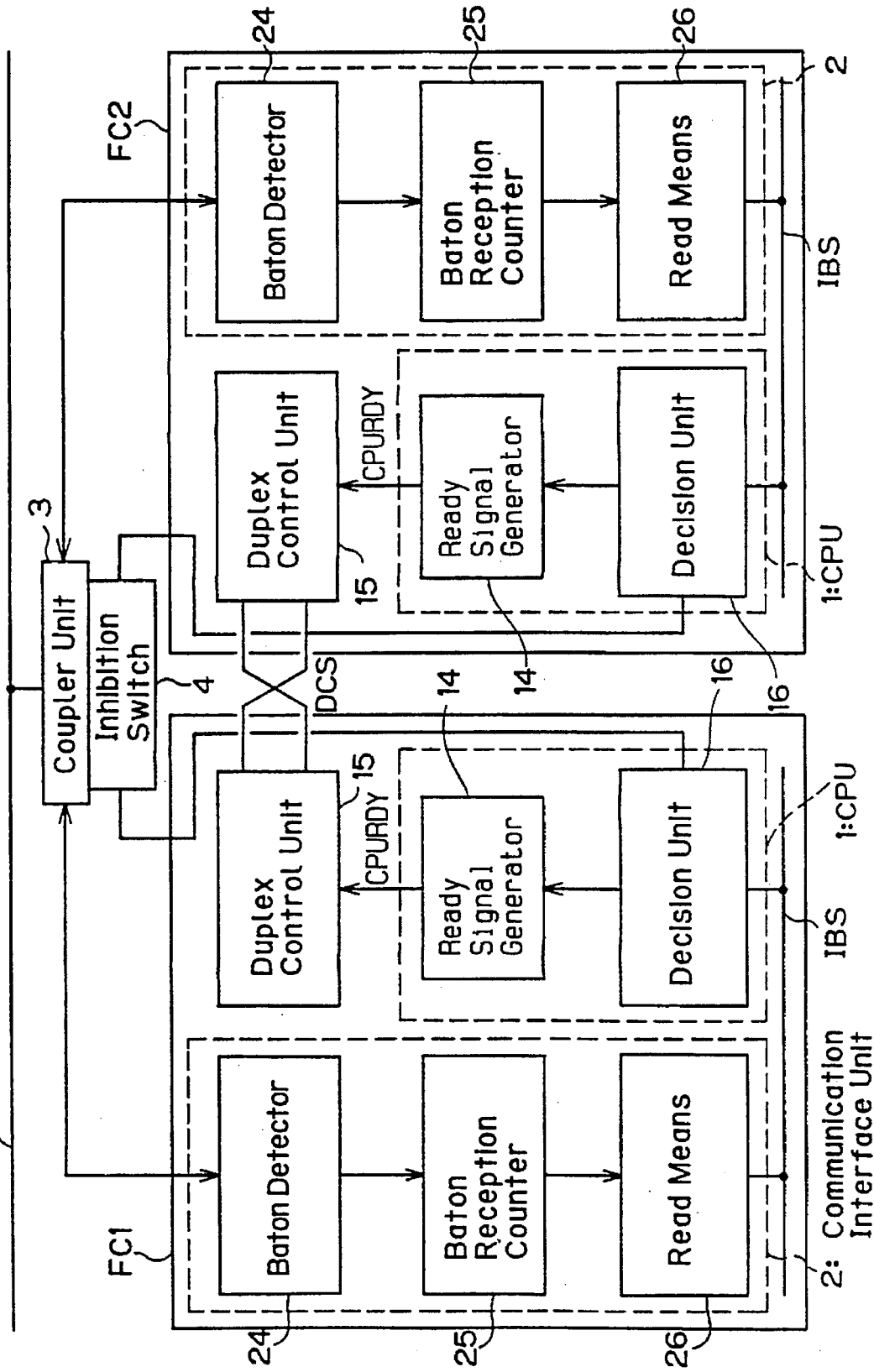
FIG. 5 is a block diagram showing the structure of a second embodiment of a duplex computer system according to the present invention.

FIG. 5 is a block diagram showing the structure of another embodiment of the present invention.

In this embodiment, each computer system has its communication interface unit 2 connected with communication line L1 via coupler unit 3, which is equipped with inhibition switch 4 for interrupting the transmission and reception functions to allow maintenance of the system. Moreover, signals indicating the connection status of inhibition switch 4 are fed to the individual decision units 16 of first and second computer systems FC1 and FC2.

Coupler unit 3 modulates or demodulates the transmitted or received signals. When inhibition switch 4 is turned on (for example, to allow maintenance of the system), transmissions and receptions are interrupted. In this inhibition status, the corresponding computer system is brought out of the circulating route of the baton frame, as in the situation where the computer system is experiencing trouble.

In this embodiment, when a status signal from inhibition switch 4 indicates that the system is not in inhibition status, decision unit 16 determines whether baton detection unit 24 is operating normally by deciding whether the content of baton reception counter 25 has been updated at a predetermined time interval. When the status signal from inhibition switch 4 indicates that the system is in inhibition status, decision unit 16 decides that baton detection unit 24 is operating normally even if the content of reception counter 25 is not updated at the predetermined time interval.

According to this embodiment, any trouble experienced by communication interface unit 2 can be accurately detected even though the system is provided with an inhibition switch for interrupting the transmission and reception functions to allow for maintenance or the like.

Each of the embodiments described above uses only one kind of baton frame to circulate along communication line L1. However, the present invention can also be applied to a total system in which a diagnosis baton is used in addition to the normal baton. While the normal baton indicates the communication right, the diagnosis baton is automatically circulated for a constant time period to indicate that a computer system which had experienced trouble has recovered. In this total system, the content of baton reception counter 25 would remain the same if a diagnosis baton is received, and would be updated only if the normal baton is detected.

As has been described above, this embodiment can detect whether communication interface unit 2 in either of computer systems FC1 or FC2 is experiencing trouble without adversely affecting the communication ability of the duplexed computer system, such that a switch can be promptly made from the one of the computer systems experiencing trouble to the other. Moreover, even if the duplexed computer system is provided with an inhibition switch 4 for inhibiting the transmission and reception functions to allow for maintenance, a communication interface unit 2 experiencing trouble still can be detected without adversely affecting the status of the inhibition switch.

Third Preferred Embodiment

Figure 6:
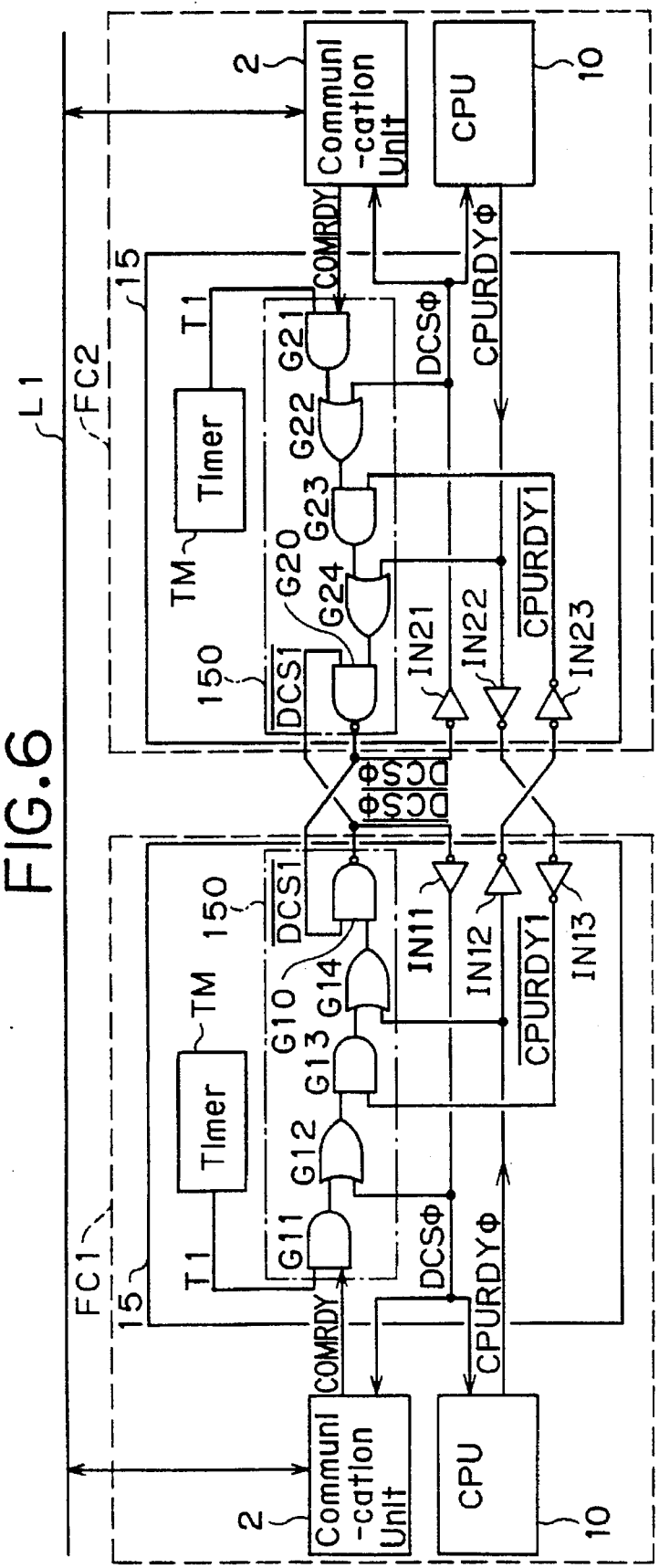
FIG. 6 is a block diagram showing the structure of a third embodiment of a duplex computer system according to the present invention.

FIG. 6 is a block diagram showing the structure of still another embodiment of a duplex computer system according to the present invention. In this embodiment, a single system structure, which can be constructed of only one computer system, is considered.

In first and second computer systems FC1 and FC2, reference numeral 10 designates a CPU that outputs a signal CPURDY0 indicating the status in which arithmetic operations, controls and decisions can be performed normally. Numeral 2 designates a communication interface unit that outputs a signal COMRDY indicating the status in which communications with a main computer terminal can be performed normally via communication line L1. Letters TM designate a timer that outputs a time-up signal T1 following a constant time period (e.g., 5 sec.) after the system is energized.

Reference numeral 150 designates a logical circuit that outputs a control allowance signal DCS0 for giving a control right to either of the duplexed computer systems FC1 or FC2. Each of these logical circuits is composed of five gates.

Specifically, logical circuit 150 is composed of: gate G11 (or G21) having as one input the signal COMRDY from communication interface unit 2, which indicates that the operations of that unit can be performed normally, and having as its other input time-up signal T1 from timer TM; gate G12 (or G22) having as one input the output signal from gate G11 (or G21) and as its other input a signal DCS0 from invertor IN11 (or IN22) indicating that the control right belongs to its side of the duplexed computer systems; gate G13 (or G23) having as one input the output signal of the gate G12 (or G22) and having as its other input a signal CPURDY1 from CPU 10 of the computer system at the partner side via an invertor IN22 (or IN12) and an invertor IN13 (or IN23), which indicates that the operations of the partner side CPU can be performed normally; gate G14 (or G24) having as one input the output signal of gate G13 (or G23) and having as its other input a signal CPURDY0 from CPU 10, which indicates that the operations of the CPU on this side can be performed normally; and gate G10 (or G20) having as one input the output signal of gate G14 (or G24) and having as its other input a signal $\overline{DCS1}$, which indicates that the control right belongs to the partner side.

Thus, gates G10 and G20 in the two computer systems FC1 and FC2 have their respective outputs $\overline{DCS1}$ input to the other gates so that both logical circuits 150 constitute a flip-flop circuit.

Therefore, if the two computer systems are ready, the computer system that will obtain the control right first at start-up depends upon which of logical circuits 150 receives signal CPURDY0 first. If the two sides are not ready, which computer system first obtains the control right at start-up depends upon which of logical circuits 150 first receives signal COMRDY. Thus, the two computer systems are not simultaneously given the control right.

Logical circuit 150 is constructed such that the conditions for acquiring and abandoning the control right are expressed by the individual signals in the following formulas (1) and (2), respectively. Here, the suffix "0" attached to the signals designates that the signals are output from the computer system at the control side (running status), and the suffix "1" designates that the signals are output from the computer system at the controlled side (standby status).

Switching condition for acquiring the control right (for raising DCS0):

$$CPURDY0*\overline{DCS1}+\overline{CPURDY1}*COMRDY*T1*\overline{DCS1} \quad (1)$$

Switching condition for abandoning the control right (for lowering DCS0):

$$DCS1+\overline{CPURDY0}*CPURDY1 \quad (2)$$

The operations of the system thus constructed will be described as follows in connection with the separate operations of raising and lowering the signal DCS0, which indicates the existence or absence, respectively, of the control right.

Raising DCS0: DCS0=0→1

The logic for raising the signal DCS0, thus indicating the existence of the control right, is expressed by formula (1).

In formula (1), the first term (the expression to the left of the "+") indicates the normal condition, under which the signal DCS0 is raised if the controlled computer system has not acquired the control right (DCS1=0) and if the CPU of the controlling computer system is in a ready status (CPURDY0=1).

The second term (the expression to the right of the "+") of formula (1) indicates that the CPU 10 of either of the two computer systems can acquire the control right, even if neither of them is ready, in order to enable its corresponding communication interface unit 2 to communicate. This is one advantageous feature of this embodiment.

Ordinarily, if the content of a non-volatile memory unit (not shown) in either of the two computer systems FC1 and FC2 (which memory unit typically contains a program used for controlling the process) is erased when power is supplied to the total system, the ready status is not established until the memory unit is loaded with the program via communication from the main computer terminal. As a result, for a constant time period after power is supplied, the CPUs 10 of the two computer systems FC1 and FC2 are not ready; thus the computer systems can neither acquire the control right (because the condition of the first term of the formula (1) is not met) nor communicate and load the program via communication interface unit 2.

The system of the present invention remedies this. When a constant time period elapses after power is supplied, timer TM raises time-up signal T1 to the value "1". As a result, according to the second term of formula (1), the control right can be acquired by the computer system on one side if its communication interface unit 2 is ready (COMRDY=1), if the partner side does not have the control right (DCS1=0), and if the partner side CPU is not ready (CPURDY1=0).

When a computer system acquires the control right, its communication interface unit 2 is enabled to communicate and to load its memory unit with the program via communication with the main computer terminal. CPU 10 is then loaded with the program and assumes ready status (CPURDY0=1) for normal operation.

Lowering DCS0: DCS0=1→0

The logic for lowering signal DCS0, thus indicating the absence of the control right, is expressed by formula (2).

According to the second term of formula (2), the control right is abandoned if the CPU of the computer system having the control right is not ready (CPURDY0=0) and if the controlled partner computer system does have its CPU ready (CPURDY1=1).

In addition, according to the first term of formula (2), in the unusual situation where, although one computer system had previously acquired the control right, the partner computer system happens to acquire the control right (DCS1=1) owing to some change in status, the control right is abandoned by the previously controlling computer. By this logic, the two computer systems FC1 and FC2 are not simultaneously given the control right.

The reason why the status of communication interface unit 2 is not a condition in the logic for lowering DCS0 is as follows. Depending upon the operating status, such as during an initialization of CPU 10, an initializing instruction may be issued to bring communication interface unit 2 into not-ready status when the CPU is not ready (CPURDY0=0). In this situation, the control right is not transferred.

Moreover, after the start of normal operations, CPU 10 is able to detect any trouble experienced by communication interface unit 2 by diagnosis of the communicating interface unit 2 (including monitoring of the status of COMRDY). If communication interface unit 2 is experiencing trouble, CPU 10 lowers the CPURDY0 signal to "0" (i.e., not-ready status).

According to the procedures thus far described, if the computer system in control status experiences trouble during its operation, the flip-flop circuit composed of the two gates G10 and G20 is inverted to transfer the control right to the computer system which has been in standby status until that time. If, in this situation, the computer system at the side experiencing trouble is taken out for repairs, for example, the status of the CPURDY1 from that side is left unchanged (CPURDY1=0) so that the flip-flop circuit is not inverted. Thus, no influence is exerted upon the operation of the other computer system.

Therefore, according to this embodiment, either of the two computer systems FC1 or FC2 is able to acquire the control right, even if they are in not-ready status, by adding a logical circuit that switches the control right based on a consideration of a status signal CPURDY1 coming from the partner CPU, so that such operations as loading programs for PID operation or sequential control operation or loading a database for operation parameters can be accomplished easily.

Fourth Preferred Embodiment

Figure 7:
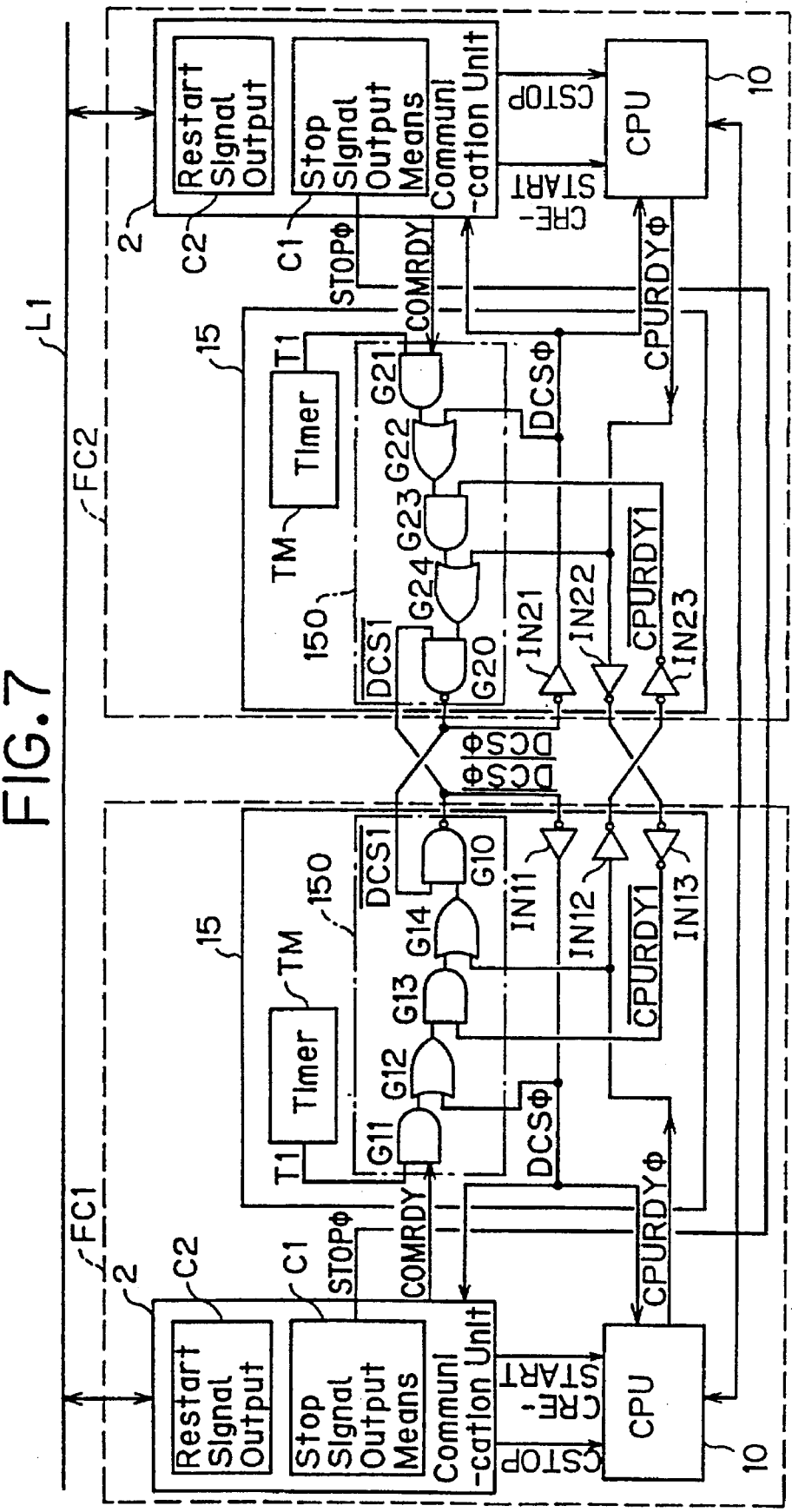
FIG. 7 is a block diagram showing the structure of a fourth embodiment of a duplex computer system according to the present invention.

FIG. 7 is a block diagram showing the structure of a further embodiment of the present invention.

In a duplex computer system, the operations of a CPU must be interrupted when the CPU is loaded with a program from the main computer terminal, for example, via a communication interface unit. This is because the CPU may hang up if the program is rewritten from the main computer terminal while the CPU is running.

This embodiment is so devised that the loading of the program to the duplexed computer system may be accomplished via communications without an adverse affect on the switching of the control right.

In FIG. 7, each CPU 10 of first and second computer systems FC1 and FC2 outputs a signal CPURDY0, which indicates a self-diagnosis that the predetermined arithmetic operations, controls, and decisions can be normally accomplished. Each communication interface unit 2 is equipped with stop signal output means C1 and restart signal output means C0. Stop signal output means C1 responds to a "stop" command from the main computer terminal; it outputs a first stop signal STOP0 to the partner CPU for stopping its operations and a second stop signal CSTOP to its own CPU after the partner CPU unit has been stopped. Restart signal output means C0 responds to a "restart" command from the main computer terminal when the total system is in a stopped status; it outputs a signal CRESTART for restarting its CPU before the partner CPU. Each duplex control unit 15 has a structure similar to that of FIG. 6.

The following describes the operation of this embodiment when the program is to be loaded from the main computer terminal via a communications interface unit.

Assume that first computer system FC1 has the control right and is performing the controlling operations. In this status, a "stop" command is transmitted from the main computer terminal prior to loading the program.

When it receives the "stop" command, stop signal output means C1 in communication interface unit 2 of computer system FC1 outputs stop signal STOP0 to CPU 10 of computer system FC2, the partner side. In response to this stop signal, CPU 10 in computer system FC2 (which is in standby status) instantly stops its operations.

After CPU 10 at the standby side has stopped its operations, stop signal output means C1 then outputs stop signal CSTOP to the CPU 10 at its side. In response to this stop signal, CPU 10 of computer system FC1 instantly stops its operations.

In this situation, the individual CPUs in the two computer systems are in a stopped status so that both the signals CPURDY0 and CPURDY1 output from each CPU are lowered. As a result, the switching conditions for the control right according to formulas (1) and (2) are not satisfied, and therefore the control right is not switched.

When the computers come into this stopped status, the loading of the program from the main computer terminal via communications unit 2 can be accomplished.

When the loading of the program via communications unit 2 is ended, a "restart" command is transmitted from the main computer terminal via communication line L1. When communication interface unit 2 receives the "restart" command, restart signal output means C2 outputs signal CRESTART to CPU 10 of computer system FC1 for restarting the CPU of the side that had the control right before the process of loading the program was started.

In response to restart signal CRESTART, the CPU 10 outputs signal CPURDY0 and starts the control arithmetic operations. After control operations have been resumed, CPU 10 in computer system FC1 outputs another restarting signal RESTART0 to CPU 10 of computer system FC2 in order to restart the CPU at the partner side. When CPU 10 in computer system FC2 is restarted, that side instantly comes into standby status because signal CPURDY0 has already been activated.

Figure 8:
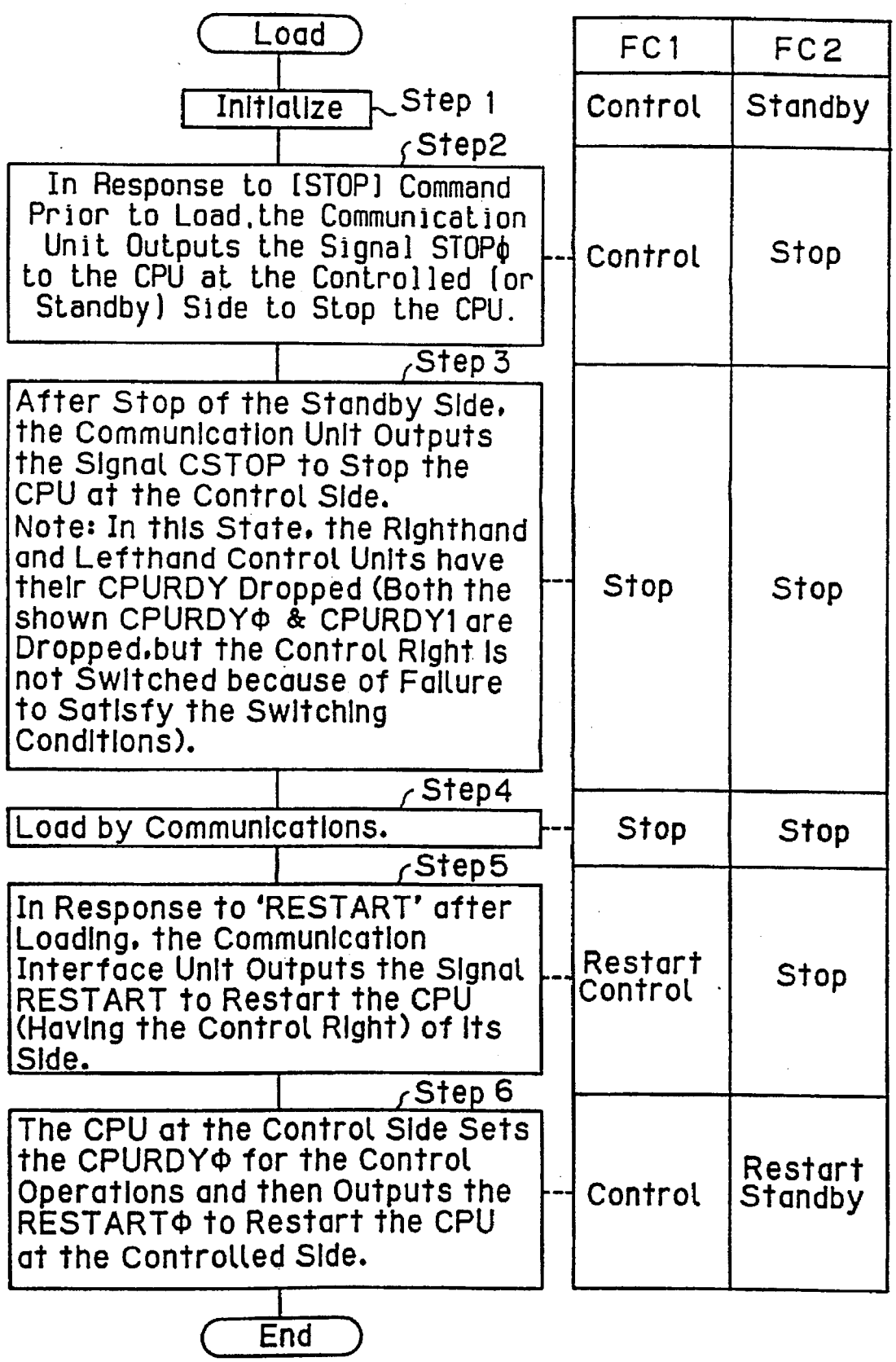
FIG. 8 is a flow chart showing the operation of loading a program to the duplex computer system via communications from a main computer terminal in the system of FIG. 7.

FIG. 8 is a flow chart showing the loading operation via a communication interface unit as described above; it also shows the status of each computer system FC1 and FC2 at the individual steps. Note that, in Step 3, FC1 and FC2 are referred to as the Lefthand and Righthand Control Units, respectively.

By these procedures, the loading of the program via communications can be accomplished without any switching of the control right during the stops and restarts of the individual computer systems.

It should be noted that the structure of duplex control unit 15 for realizing these operations should not be limited to that shown in FIG. 7; timer TM, for example, may be dispensed with.

Fifth Preferred Embodiment

Figure 9:
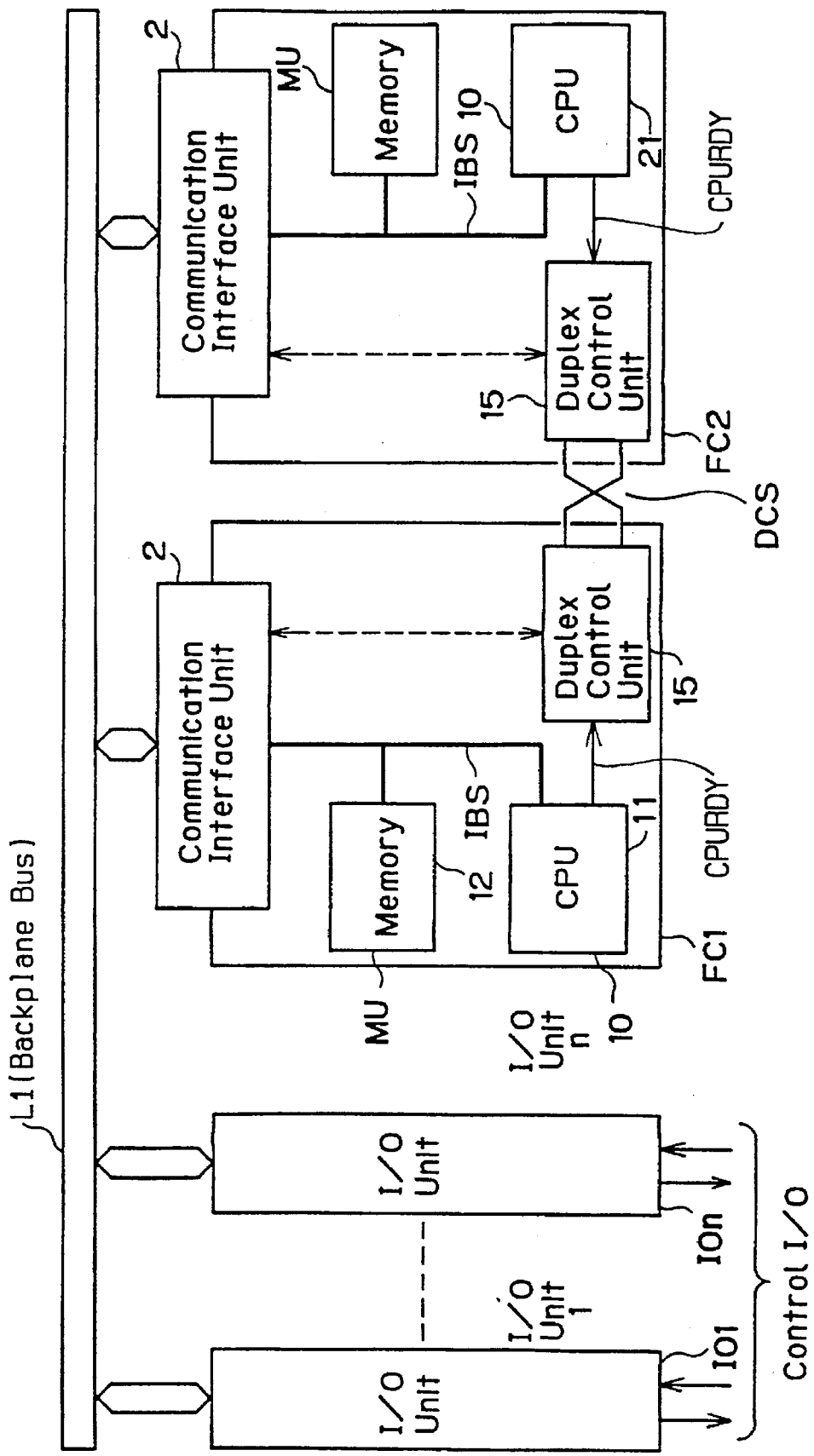
FIG. 9 is a conceptual diagram of the structure of a fifth embodiment of a duplex computer system according to the present invention and shows a configuration including a plurality of input/output units connected with a communication line.

FIG. 9 is a block diagram showing the concept of a duplex computer system according to the present invention connected to several input/output (I/O) units via communication line L1 (i.e., a backplane bus). This further embodiment is constructed so that the duplex switching can be accomplished even when the backplane bus experiences trouble.

In FIG. 9, reference characters FC1 and FC2 designate computer systems having duplex structures connected with communication line (i.e., backplane bus) L1. Characters IO1 and IOn designate a variety of I/O units numbered 1 through n connected with backplane bus L1.

In each of duplex computer systems FC1 and FC2, letters MU designate a memory unit which is connected with CPU 10 and communication interface unit 2 via an internal bus IBS.

When CPU 10 accesses backplane bus L1, communication interface unit 2 rereads the signals (or data) output on individual signal lines to the backplane bus, comparing them so that it may check whether the signals were correctly output to the backplane bus. If a signal it attempted to send does not coincide with the signal when reread, communication interface unit 2 interrupts its access and informs CPU 10 that an error in accessing backplane bus L1 has occurred.

Figure 10:
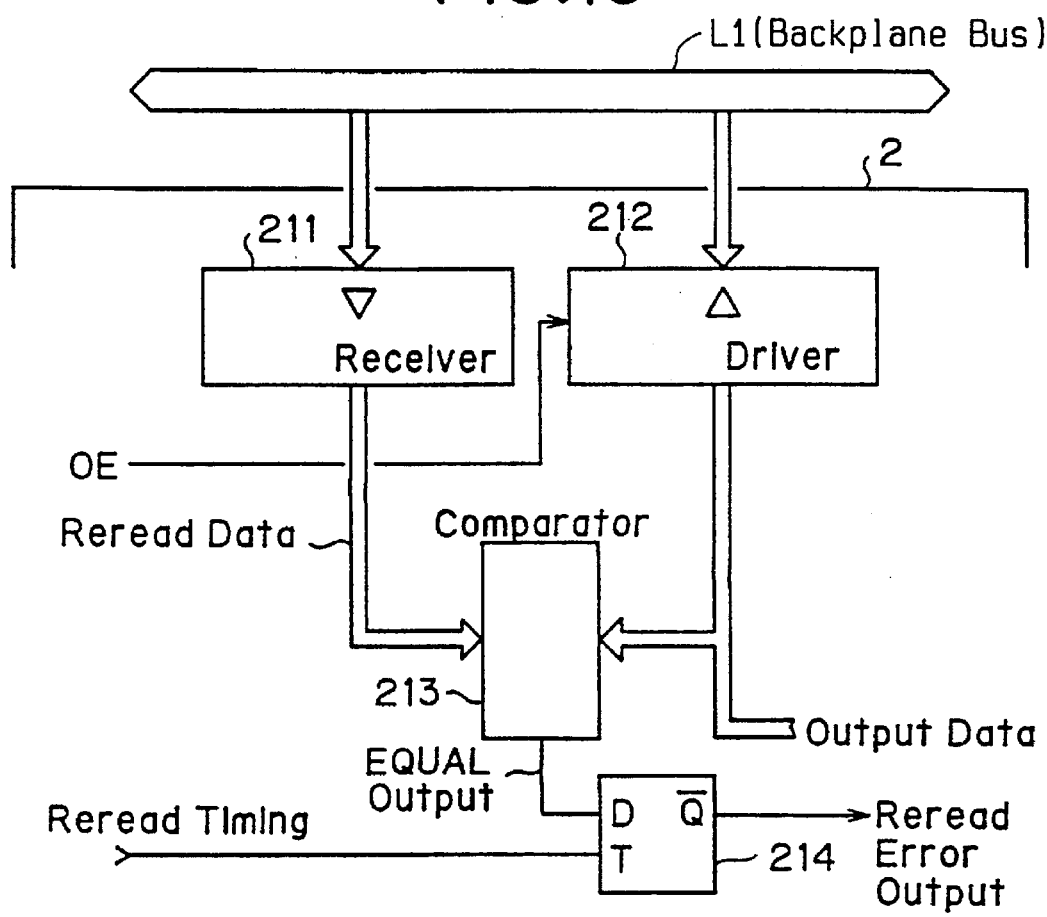
FIG. 10 is a block diagram showing the structure of one example of a circuit for providing the ability to reread signals on signal lines of a communication interface unit in the embodiment of FIG. 9.

FIG. 10 is a block diagram showing the structure of one example of a circuit for providing the ability to reread the signal on the signal lines in communication interface unit 2.

In FIG. 10, reference numeral 211 designates a receiver for reading the signals on the individual data lines on backplane bus L1, and numeral 212 designates a driver for transmitting the output data of CPU 10 to backplane bus L1. Numeral 213 designates a comparator for comparing the data output to the backplane bus with the data reread from the individual signal lines of the backplane bus. Numeral 214 designates a timing control circuit, which is constructed of a flip-flop, for transmitting the output of the reread errors determined by the comparison result of comparator 213.

Assume that both duplexed computer systems FC1 and FC2 are performing normal operations (that is, the ready signals CPURDY from each individual CPU 10, as shown in FIG. 9, are active) and that computer system FC1 is in controlling status while computer system FC2 is in standby status. The causes of errors in the reread checks of backplane bus L1 can be classified as follows:

(a) Internal trouble experienced by communication interface unit 2 in the system of the control side;

(b) Trouble experienced either by driver 212 or receiver 211 of the systems of the control or standby sides or by the I/O units IO1 to IOn; and (c) Trouble experienced by the backplane bus.

The error causes of classes (b) and (c) affect both computer systems because the individual computer systems are connected with common backplane bus L1. This embodiment of the present invention deals effectively with the error causes of class (a) that may occur, as will be described in the following.

Consider the situation in which communication interface unit 2 between computer system FC1 and backplane bus L1 goes out of order, such that the correct signals cannot be transmitted to the backplane bus. If computer system FC1 attempts to access an I/O unit, errors are detected by the reread capability of communication interface unit 2 and the access is interrupted. In addition, CPU 10 is informed of the occurrence of the reread check errors.

Figure 11:
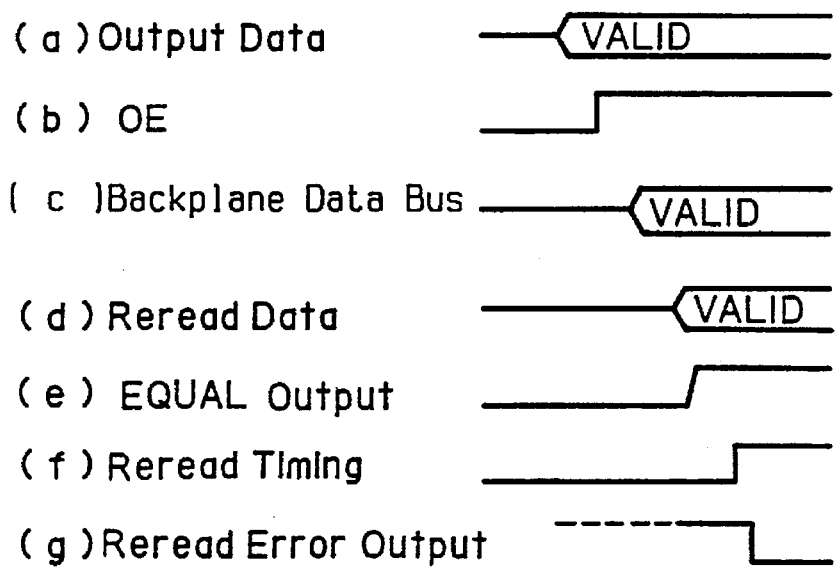
FIG. 11 is a timing chart showing the operations of the signal rereading function at the communications interface unit.

FIG. 11 is a timing chart showing the operations of the reread capability of communication interface unit 2 described above. Computer system FC1 transmits output data to the I/O units, as shown at (a). This data is output in the form of output enable signal OE, as shown at (b), via driver 212 to backplane bus L1, as shown at (c).

The data thus output to backplane bus L1 is reread via receiver 211, as shown at (d), such that it is compared with the output data in comparator 213. As shown at (e), if this comparison shows coincidence, the EQUAL output turns active to indicate no error; if the comparison shows incoincidence, the EQUAL output turns inactive to indicate the occurrence of a reread error. At the reread timing shown at (f), CPU 10 receives the reread error output signal, shown at (g), that is output from timing control circuit 214.

In response to the reread error output signal coming from communication interface unit 2, CPU 10 assumes a not-ready status and interrupts the accessing and controlling operations to prevent erroneous data from being transferred to the I/O unit.

When ready signal CPURDY from CPU 10 of computer system FC1 turns inactive, duplex control unit 15 outputs duplex control signal DCS, thus giving the control right to computer system FC2. As a result, computer system FC2, which had been held in standby status, starts its controlling operations to continue operation of the total system.

In sum, for the error causes of class (a) described above, the output data is reread to detect any transmission error. If an error is detected, the access to the backplane bus is interrupted in determining that the communication interface unit at the system of the control side is experiencing trouble, and the CPU lowers the ready signal CPURDY to switch the duplexing (transfer the control right).

If CPU 10 detects errors other than the ones described above caused in connection with accessing the backplane bus, such as those coming from trouble experienced inside the computer systems (e.g., parity errors for the data read, no response to the access, or inability of acquiring the bus right), it lowers the ready signal CPURDY to switch the duplexing.

If error causes belonging to classes (b) and (c) as described above occur, the control side CPU also detects them and lowers its ready signal CPURDY to switch the duplexing. Since, in this case, the error causes belonging to classes (b) and (c) intrinsically affect both computer systems FC1 and FC2, the other computer system, having newly started the controlling operations, also causes its CPU to lower the ready signal. As a result, the functions of the total system are interrupted.

The trouble experienced by one computer system can be prevented from exerting influence upon the other computer system if communication interface unit 2 is constructed to receive the signal indicating the presence or absence of the control right from duplex control unit 15, as indicated by broken lines in FIG. 9, and the duplexed computer systems are given the following capabilities. First, the ability of either computer system FC1 or FC2 to inhibit accesses to I/O units IO1 to IOn if the control right is not given to the computer system. Second, the ability to map the data used by the computer systems for controlling the process on a different address region of memory unit MU than the address region accessed via backplane bus L1. And third, the ability to inhibit writing to the addresses accessed via the backplane bus. The provision of these capabilities in the present invention will be described below.

Figure 12:
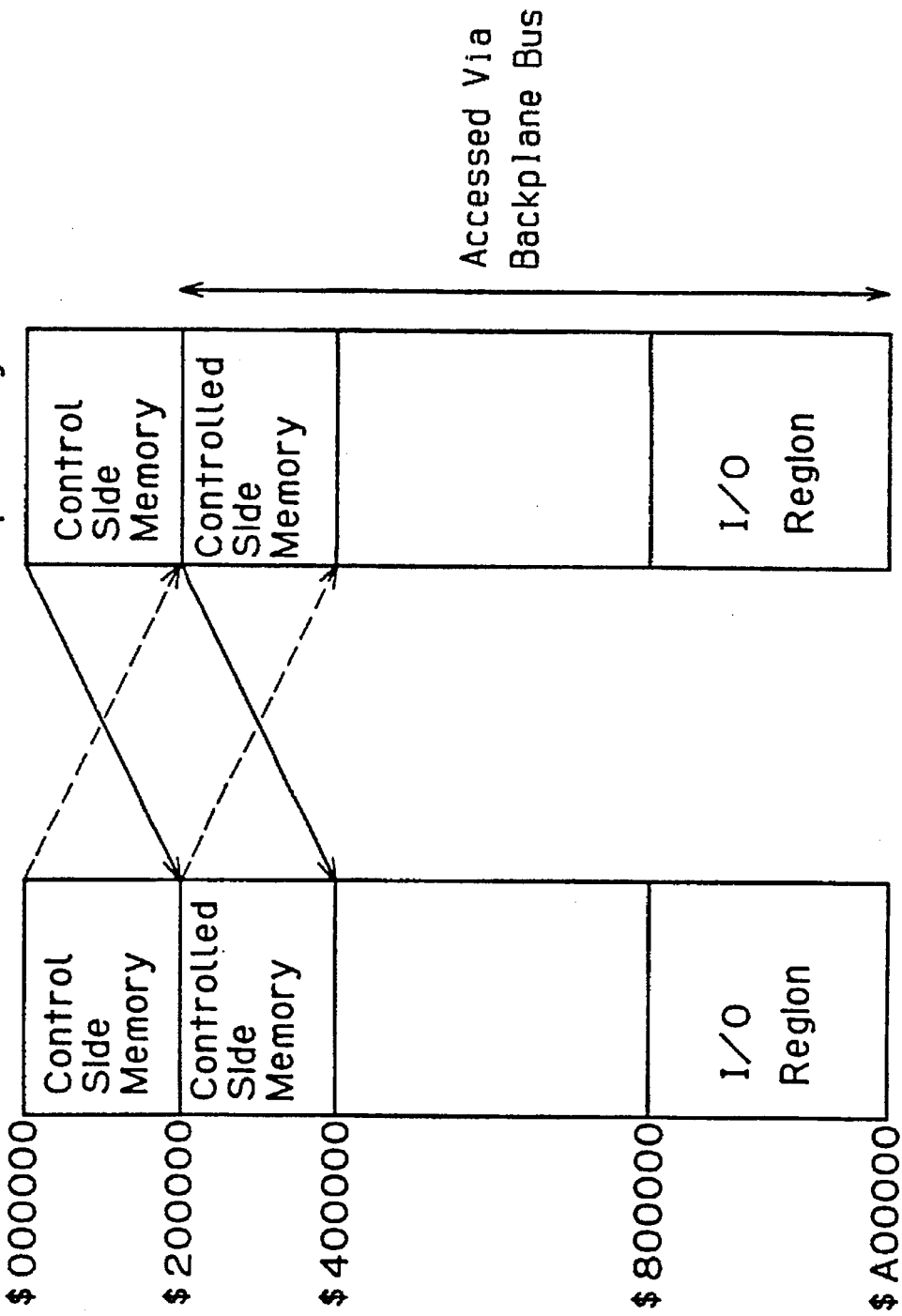
FIG. 12 is a diagram showing an example of an address map for a CPU in each computer system.

FIG. 12 is a diagram showing an example of an address map for CPU 10 in each of computer systems FC1 and FC2.

Each computer system FC1 and FC2 has its own internal memory at addresses $ 000000 to $ 1FFFFF, to be used when either is the control side. The memory region $ 000000 to $ 1FFFFF in FC1 can be accessed only by FC1, and that memory region in FC2 can be accessed only by FC2. Regions $ 200000 to $ 9FFFFF are assigned to backplane bus L1.

For each computer system FC1 and FC2, the internal memory regions $ 200000 to $ 3FFFFF are assigned to each other's partner side. Thus when one side has the control right, it can access this memory region in the partner side via backplane bus L1. I/O regions for addressing the controlled I/O units are assigned to $ 800000 to $ 9FFFFF.

Communication interface unit 2 has the following functions:

(a) Arbitration function to acquire a bus master right;
(b) Bus master function; and
(c) Bus slave function.

The bus master function enables the I/O region of the address map of FIG. 12 to be accessed only by the computer system having the control right. This ensures that a computer system that loses the control right because it is experiencing trouble will not be able to output erroneous data to the I/O unit.

On the other hand, the bus slave function disables access from backplane bus L1. This is to protect the operations of the CPU against access from outside hardware.

Moreover, the bus slave function responds to the addresses $ 200000 to $ 3FFFFFF, which may be accessed via the backplane bus, and accesses to the internal memory are accomplished at addresses $ 0000000 to $ 1FFFFF. The latter two addresses are determined by subtracting $ 200000 from the previous set of addresses, to arrive at the address map shown in FIG. 12.

For example, assume that computer system FC1 is in control status (engaged in real work) while computer system FC2 is in standby status. In this situation, computer system FC1 is the control side, executing the controlling operations in accordance with a program stored in the internal memory of memory unit MU. In these operations, input data is read from I/O units IO1 to IOn via backplane bus L1 and is subjected to necessary calculations. After this, output data is transmitted via backplane bus L1 to I/O units IO1 to IOn.

Computer system FC2, at the standby side, does not perform the standby operations before determining that the hardware, the program, and the data are operating normally. First, after the start of the operations of computer system FC1 at the control side, the program and data of computer system FC1 are read out via backplane bus L1 and stored in memory MU of the computer system FC2 at the standby side. Then, after the program and data have been stored, the standby operations are started.

If, in this situation, computer system FC1 at the control side experiences trouble, the data is passed to computer system FC2 so as to continue the control operations smoothly. This is referred to as equalizing the data. Specifically, during the control operations of the computer system at the control side, the data and parameters of the process under control are periodically changing, and the computer system at the control side stores the data and parameters in predetermined positions when operating in control status so that the standby side can utilize them when it assumes control status. When computer system FC1 is the control side, these data and parameters are sequentially copied in its memory unit MU in the region from $ 200000 to $ 3FFFFF so that computer system FC2, at the standby side, may access them via backplane bus L1 if it assumes control status.

By this procedure, computer system FC2 at the standby side always has the data and parameters necessary for control of the process as those of computer system FC1 at the control side. Therefore, it can continue to execute the control operations smoothly if the computer system at the control side experiences trouble and the computer system at the standby side must be placed in control status.

The operation of the duplex computer system in the situation where computer system FC2 at the standby side experiences trouble will be described as follows.

For example, assume that the computer system at the standby side malfunctions by continually writing to arbitrary addresses. In that case, the arbitrary address writing operations are blocked by the bus master and bus slave functions of communication interface unit 2 described above, so that no influence is exerted upon the control operations of the total system.

In the duplex computer system as described above, none of the memory unit regions at the control side can be written to by the computer system at the standby side. However, the structure may be modified such that only the memory unit regions containing the program, data and parameters necessary for the control operations cannot be written to, whereas the memory unit regions for equalizing the data can be written to.

According to this embodiment, the trouble experienced by one computer system will exert no influence upon the control operations of the other computer system, thus improving the reliability of the total system.

Moreover, the operations for equalizing the data and parameters may be accomplished through duplex control units 15 disposed in the individual computer systems and adapted especially for that purpose. In addition, the software for the individual duplex control units can be shared between the two computers by storing the software in identical memory addresses in the memory units of the two computer systems.

Sixth Preferred Embodiment

Figure 13:
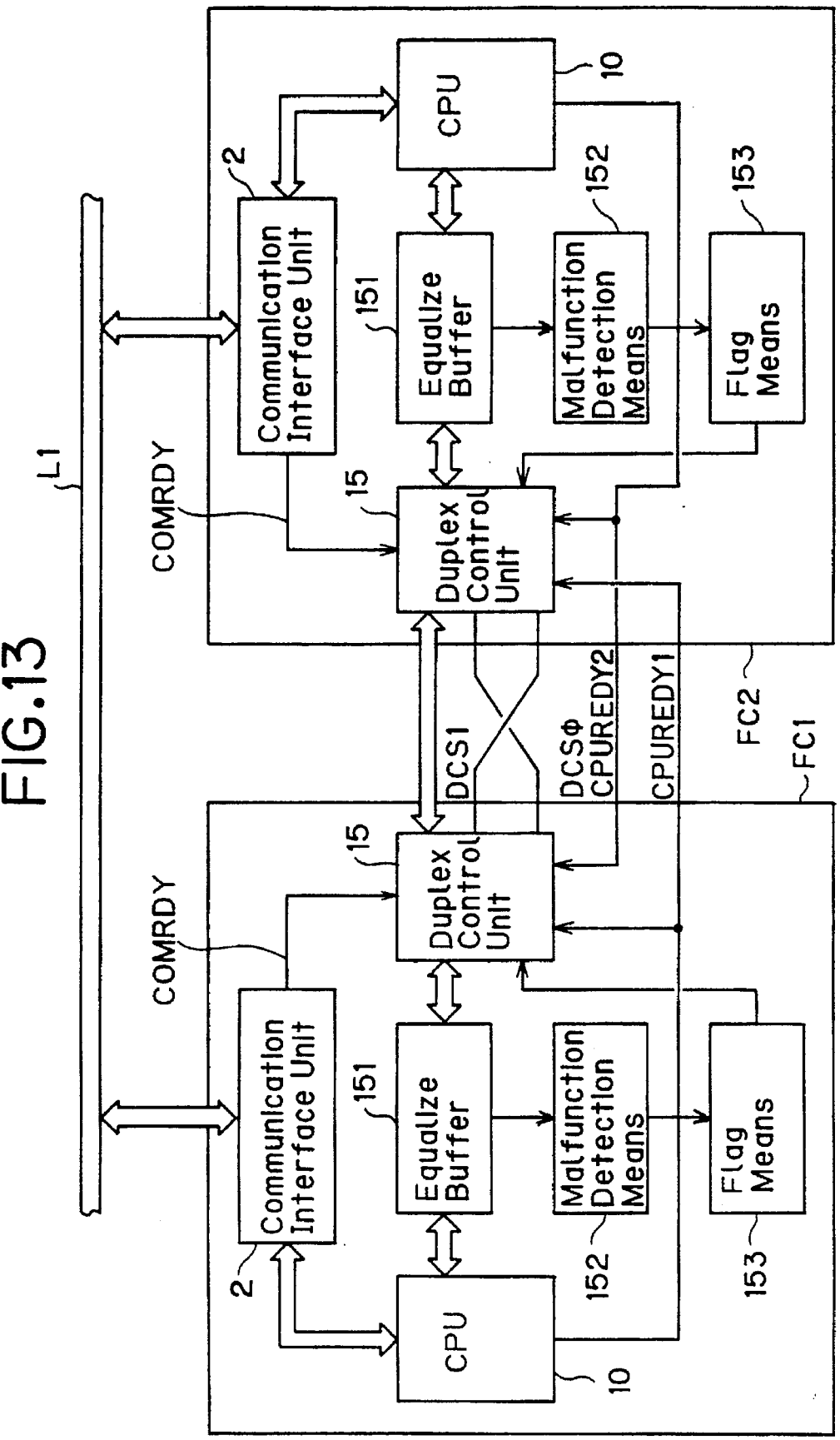
FIG. 13 is a block diagram showing the structure of a sixth embodiment of a duplex computer system according to the present invention.

FIG. 13 is a block diagram showing the structure of a further embodiment of the present invention. This embodiment is devised so that the equalization of the data from the control status to the standby status may be done more smoothly.

In each of computer systems FC1 and FC2, reference numeral 151 designates an equalize buffer which is stored with the data to be equalized between the two computer systems and which is disposed, for example, in the RAM of the computer system (not shown). Numeral 152 designates a data malfunction detection means for detecting a malfunction of the data which is stored in the equalize buffer 151, and numeral 153 designates a flag means which is raised when a malfunction is detected by the data malfunction detection means.

Duplex control unit 15 is constructed such that it refers to flag means 153 when the control right is to be switched (transferred). If the flag is OFF, duplex control unit 15 starts switching the control right; if the flag is ON, duplex control unit 15 transmits the control output DCS0 after a predetermined time period has elapsed.

Duplex control unit 15 receives ready signal CPUREDY1 from its own CPU 10; ready signal CPUREDY2 from CPU 10 of the computer at the partner side; ready signal COMRDY indicating that communication interface unit 2 can perform its operations normally; and the signal from flag means 153. In accordance with the status of each of these signals, duplex control unit 15 outputs a duplex control switching signal DCS0 such that the proper one of the computer systems may be placed in control status.

FIG. 14 is a diagram showing the concept of the data equalizing operations.

This embodiment assumes that computer system FC1 is in control status (engaged in the real work) while computer system FC2 is in standby status. In this situation, equalize buffer 151 of computer system FC1 at the control side is stored with the data to be equalized between a start mark STM and an end mark EDM.

Computer system FC2 at the standby side reads the value of the pointer P0 of equalize buffer 151 at the control side. If the value read is equal to the previous one, computer system FC2 determines that no new equilization data has been received and decides not to perform the equalization operations. If the value of the pointer is changed, the data stored in equalize buffer 151 between start mark STM and end mark EDM is copied from computer system FC1 at the control side.

The data to be equalized is composed of addresses and data, which are sandwiched between the start mark and the end mark, and are used for initializations of the system. Computer system FC2 at the standby side copies the data beginning at a designated address until the end mark EDM is found in the copied data.

Malfunction detection means 152 of computer system FC2 at the standby side detects any defects in the start mark or the end mark, and any malfunctions of the data in the equalize buffer in case the equalize buffer is fully occupied by errors either in the pointer read or in the update of the pointer of the equalize buffer at the control side. If these malfunctions are detected, the flag means 153 is raised (or turned ON).

The equalization operations described above are executed at all times in the computer at the standby side so that switching of the control right may be accomplished smoothly at any arbitrary time.

If the CPU, for example, of the computer system FC1 at the control side experiences trouble, then the signal CPUREDY1 is lowered so that duplex control unit 15 responds by inverting the signal DCS0 for switching the control right to transfer the real work to computer system FC2 which has been in standby status until that time.

When the control right is transferred, duplex control unit 15 of computer system FC2 refers to flag means 153 to assume control status instantly if the flag is OFF.

However, if flag means 153 is ON, duplex control unit 15 is interrupted for a predetermined time period (e.g., one minute), and then operates to transmit the control right.

For this one-minute interruption, an idling operation is commenced to perform the initializations of necessary data or the like, or to load the program, and to turn the flag OFF. When the one minute has elapsed has elapsed, the computer system having the control right can start operation normally.

The individual embodiments thus far described have assumed that communication line L1 is of single structure, but the communication line may also be duplexed.

What is claimed is:

1. A duplex computer system having two computer systems, one of which is in a control status and the other of which is in a standby status, and a communication line of baton pass type capable of communication functions, in which the communication functions are accomplished when a baton frame representing a communication right is circulated to one of the computer systems, each one computer system comprising:

baton detection unit means for detecting a baton frame addressed to the computer system;

baton reception counter means for storing a value and for updating the value when said baton detection unit means detects the baton frame;

decision unit means for reading out the value stored in said baton reception counter means for instructing the computer system which has been in standby status to assume the control status if the value stored in said reception counter means is not updated after a predetermined time period has elapsed;

ready signal generation means made responsive to an instruction signal from said detection unit means for outputting a ready signal (CPURDY) in an active or an inactive state on the basis of the instruction signal and the result of a self-diagnosis;

duplex control unit means made responsive to said ready signal (CPURDY) for controlling whether the one computer system assumes the control status or the standby status;

communication interface unit means for communicating with a main computer terminal and outputting a signal (COMRDY) indicating that its operations can be performed normally; and timer means for outputting a time-up signal (T1) after a predetermined time period has elapsed since power was supplied to said duplex computer system, wherein said duplex control unit means comprises logical circuit means for outputting a signal based on signals that it receives and means for receiving:

a ready signal (CPURDY0) from the ready signal generation means of the one of the computer systems;

the signal (COMRDY) indicating that the operations of said communication interface unit means can be performed normally;

the time-up signal (T1) from said timer means;

a ready signal (CPURDY1) from the ready signal generation means of the other computer system;

a signal (DCS0) indicating that a control right belongs to the one of the computer systems; and a signal (DCS1) indicating that the control right belongs to the other computer system.

2. A duplex computer system as claimed in claim 1, wherein said logical circuit means indicates that the one of the computer systems acquires the control right by setting to a value of "1" the signal (DCS0) indicating that a control right belongs to the one of the computer systems if the conditions of the following formula (1) are satisfied in the case where the control right does not already belong to the one computer system (DCS0=0):

$$CPURDY0 * \overline{DCS1} + CPURDY1 * COMRDY * T1 * \overline{DCS1} \qquad (1);$$

and, wherein said logical circuit means indicates that the computer system abandons the control right by setting the signal (DCS0) indicating that a control right belongs to the one of the computer systems to a value of "0" if the conditions of the following formula (2) are satisfied in the case where the control right already belongs to the one computer system (DCS0=1):

$$DCS1 + \overline{CPURDY0} * CPURDY1 \qquad (2).$$

3. A duplex computer system as claimed in claim 1, wherein said duplex control unit means determines which computer system obtains a control right based on signals it receives, and for receiving the ready signal (CPURDY0) indicating that the operations of the one of the computer systems can be performed normally, and the ready signal (CPURDY1) indicating that the operations of the other computer system can be performed normally, a signal DSC0 indicating that the control right belongs to the one of the computer systems, and a signal (DSC1) indicating that the control right belongs to the other computer system; and wherein said communication interface unit means communicates with a main computer terminal, for outputting a signal (STOP0) to stop the operations of the other computer system if said communication interface unit means receives a "stop" command from said main computer terminal, and for outputting a signal (CRESTART) for restarting the other computer system before the one of the computer systems is restarted if said communication interface unit means receives a "restart" command from said main computer terminal while the duplex computer system is in a stop status.

* * * * *